Aug. 13, 1963
G. W. BROWN
3,100,637
SHEET CONVEYING MECHANISM
Filed June 26, 1961
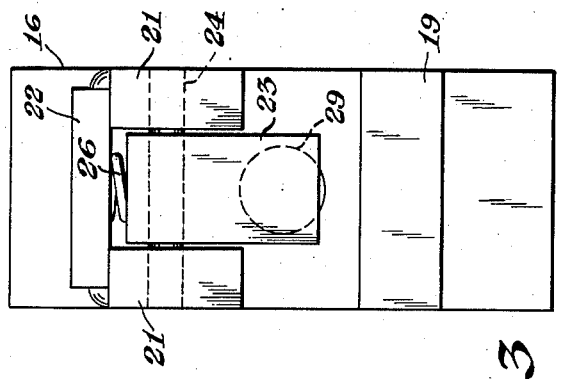
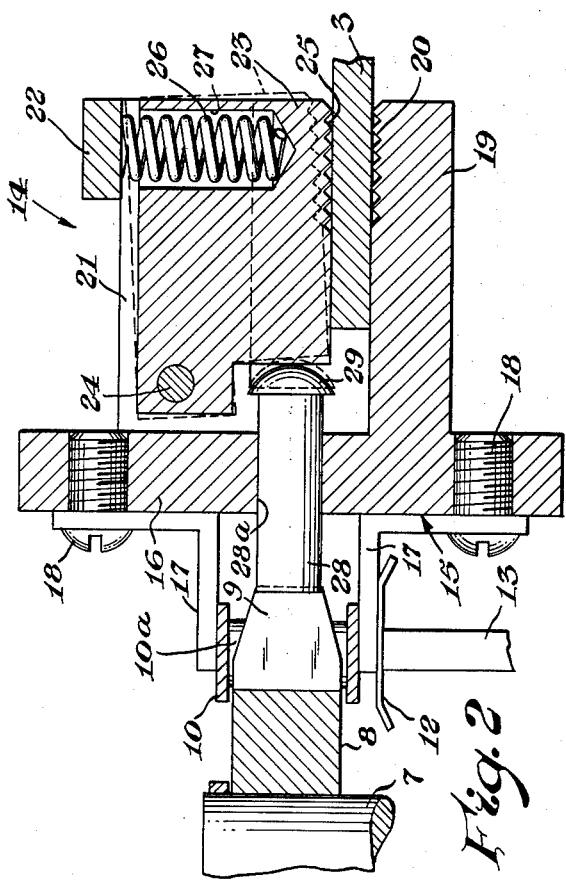
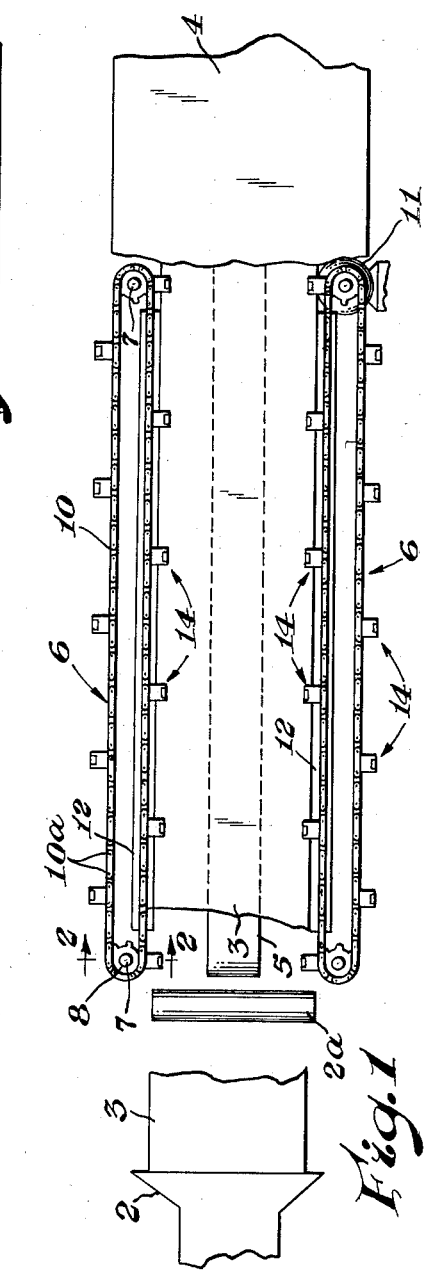
INVENTOR.
Gaylord W. Brown
BY
*Harman, Harman & McCulloch*
ATTORNEYS

United States Patent Office 3,100,637
Patented Aug. 13, 1963

3,100,637
SHEET CONVEYING MECHANISM
Gaylord W. Brown, Beaverton, Mich., assignor to Brown Machine Co., Beaverton, Mich., a corporation of Michigan
Filed June 26, 1961, Ser. No. 119,545
5 Claims. (Cl. 271—79)

This invention relates to conveying mechanisms and more particularly to conveyors having automatically operated gripper devices adapted to grip and convey sheet material along a path.

Sheet conveyor gripper mechanisms which have been proposed heretofore have usually relied upon stationary cams or other external devices to actuate the gripper jaws so as to enable the moving grippers to engage and release the sheets at the proper times. Such mechanisms have required the grippers and their actuating cams to be located precisely relatively to one another in order to avoid either premature or delayed opening and closing of the grippers and have been so designed that an unduly wide spread of the gripping jaws was obtained. Moreover, the use of stationary cams has caused an undue amount of wear on the relatively slidable parts, thereby effecting an undue amount of wear on the gripper actuating devices and necessitating their frequent replacement or adjustment.

An object of this invention is to provide a sheet conveying gripper mechanism which permits the elimination of some parts heretofore thought necessary and at the same time overcomes certain disadvantages of prior devices.

Another object of this invention is to provide a conveying gripper mechanism which is integrated into the conveyor apparatus and which includes self-contained means for effecting opening and closing of the gripper devices.

A further object of the invention is to provide sheet conveying and gripping mechanism wherein the gripper devices are opened and closed automatically by the conveyor driving mechanism.

Another object of the invention is to provide conveyor mechanism of the class described wherein the grippers provide support for the sheets over substantially the entire path they travel and which open and close automatically at opposite ends of the path without subjecting the sheets to any pulling or tearing forces.

Other objects and advantages of the invention will be pointed out in detail or will become apparent from the following description when it is considered in conjunction with the appended claims and the accompanying drawings, in which:

FIGURE 1 is a somewhat diagrammatic, top plan view of apparatus constructed in accordance with the invention and arranged in a typical plastic sheet forming installation;

FIGURE 2 is an enlarged sectional view taken on the line 2—2 of FIGURE 1; and

FIGURE 3 is a front elevational view of the apparatus shown in FIGURE 2.

Conveying and gripping mechanism constructed in accordance with the invention is adapted for use in a plastic sheet forming assembly of the type illustrated in Patent No. 2,967,328 and may include an extruder 1 having a head or nozzle 2 through which plastic material is extruded to form a continuous sheet 3. The sheet 3 is adapted to be conveyed from between a pair of vertical sizing rolls 2a, supported one above another to form a sizing nip therebetween, along a substantially horizontal path to a molding unit 4 of the type disclosed in the aforementioned patent, and to aid in supporting the sheet an intermediate endless belt 5 or several such belts may be employed to convey the sheet from between the sizing rolls. Alternatively, the sheet 3 may be taken from a preformed roll of material.

On either side of the path of the sheet 3 is mounted a sheet conveying and gripping mechanism designated generally by the reference character 6. Each mechanism is the same, so only one need be shown and described in detail.

As is best illustrated in FIGURE 1, each of the mechanisms 6 includes a pair of spaced apart, vertically arranged shafts 7, adjacent the upper end of each of which is mounted a driving sprocket wheel 8 having radially projecting teeth 9. Around each of the sprocket wheels 8 is trained an endless, driven sprocket chain 10 which is composed of a plurality of links pivotally connected one to another and having a space between adjacent pivot pins 10a through which the teeth 9 of the sprocket wheels are adapted to extend in the usual manner. Means for driving the chains 10 may comprise an electric motor 11 connected by suitable gearing to one of the shafts 7 which, in turn, is connected by suitable gearing or a chain drive (not shown) to the adjacent shaft 7. It will be understood that the driving shafts 7 on opposite sides of the sheet 3 are rotated in opposite directions and at the same speed so that the two inner runs of the chains move in the same direction and at the same speed.

It is preferred that the driving force be imparted to the chains 10 at the molding machine end of the chains in order to maintain the two inner runs of the chains as taut as possible. The inner runs of the chains may be supported against sagging by shelves 12 which are positioned beneath the chains and supported on frame members 13.

At uniformly spaced intervals along each of the chains 10 is a gripper device 14. Again, each gripper is identical, so only one need be described in detail.

A gripper device 14 comprises a body 15 having an upright member 16 to which a pair of angle brackets 17 are secured by suitable means such as screws 18. The angle brackets 17 also are secured, as by welding or the like, to opposite sides of a link of the chain 10 so that the body member moves with the chain. Supported on the member 16, and preferably integral therewith, is a fixed gripper jaw 19 which may have serrations 20 in its outer, upper surface if desired.

Above the level of the fixed jaw 19 the member 16 is provided with a pair of forwardly extending, spaced apart ears 21 which are joined to one another at their outer ends by a cross bar 22 that may be welded or otherwise secured to the ears 21. Between the ears 21 is an upper, movable jaw 23 that is pivoted adjacent its upper, rearward end on a pin 24 which is received in and spans the two ears 21. The lower, outer surface of the jaw 23 may be provided with serrations 25, if desired.

It is preferred that the jaw 23 normally be urged in a direction toward the fixed jaw 19. Means for yieldably biasing the jaw 23 toward the fixed jaw comprises a coil spring 26 received in a blind bore 27 formed in the jaw 23 and reacting between the base of the bore and the lower surface of the cross bar 22.

Each of the gripping devices 14 includes self-contained actuating means for effecting movement of the movable jaw 23 in a direction away from the fixed jaw 19. In the disclosed embodiment of the invention, the actuating means for each of the gripping devices comprises a linearly reciprocable pin or post 28 that is slideably mounted in an opening 28a formed in the vertical member 16 of the gripper body. The pin 28 has a smoothly rounded head 29 at the end which is adapted to engage the rear surface of the movable jaw, and its other end is flattened to correspond substantially to the shape of the individual teeth 9 of the sprocket wheels 8. The opening 28a should be so located in the body member 16 as to be at the center of the space between adjacent links of the chain 10 so as to assure engagement between the pin 28 and a sprocket tooth extending through that space.

The spring 26 normally urges the movable jaw 23 towards the fixed jaw 19, as has been indicated, and the force of the spring is transmitted through the jaw 23 to the pin 28 to urge it to the outward position indicated in full lines in FIGURE 2. Thus, there is no likelihood that the pin may become inadvertently separated from the body. The grippers will be effective for various thicknesses of material from .002" to the maximum size for which they are designed.

To condition the apparatus for operation, the chains 10 are preferably mounted in the manner illustrated in FIGURE 1. The length of the runs of the chains may vary, but the inner runs of the chains span substantially the length of the plastic forming assembly from the sizing rolls 2a forwardly. When the driving motor 11 is started, the two inner runs of the chains 10 and their gripper devices 14 will move from the sizing rolls or from a roll of sheet where preformed material is used to and through the working area of the molding unit 4.

As the chains travel around the sprocket wheels 8 at the extruder end of the apparatus the actuating pins 28 of the associated grippers will be engaged by one of the teeth of the respective sprocket wheels and urged forwardly to the projected position indicated by dotted lines in FIGURE 2. The forward movement of the pins 28 will be transmitted to the movable jaws 23 so as to urge them in a counterclockwise direction, as viewed in FIGURE 2, so as to increase the separation between the jaws 23 and 19 an amount sufficient only to accommodate the edges of the sheet 3 freely therebetween. As the chains continue to be driven, the links bearing the open gripper mechanisms 14 will pass beyond the sprocket wheels 8, whereupon the teeth that engage the pins 28 will be withdrawn from between the links, permitting the springs 26 to move the movable jaws 23 toward the fixed jaws 19, whereupon the edges of the plastic sheet 3 will be gripped between the jaws. Movement of the jaws 23 toward the fixed jaws 19 will cause the pins 28 to be moved rearwardly. The edges of the sheet thus will be held and conveyed from the extrusion machine toward the molding unit 4.

As the gripper mechanisms pass beyond the molding unit 4, their actuating pins 28 will be engaged by the teeth of the respective front sprocket wheels and projected in a direction to move the movable jaws 23 away from the fixed jaws 19, thereby allowing the gripper mechanisms to release the sheet 3 prior to movement of the grippers transversely of the sheet. Thus, marring, tearing, or pulling of the sheets is avoided.

The disclosed embodiment is representative of a presently preferred form of the invention, but is intended to be illustrative rather than definitive thereof. The invention is defined in the claims.

I claim:

1. Conveying mechanism comprising an endless driven member having an opening therein; a driving member around which said driven member is trained, said driving member including a part adapted to extend therefrom through said opening; a body mounted on said driven member adjacent said opening; a pair of jaws mounted on said body for relative movement toward and away from one another; yieldable means urging said jaws toward one another; and actuating means adjacent said opening engageable with said part of said driving means incorporated with at least one of said jaws for effecting relative movement of said jaws away from one another upon engagement of said part and said actuating means.

2. Conveying mechanism for conveying a sheet or the like along a path, said mechanism comprising an endless chain composed of sprocket links pivotally connected one to another and having an opening between adjacent links, said chain having a run parallel to said path; a pair of sprocket wheels located one at each end of said run of said chain and around which said chain is trained, each of said wheels having teeth adapted to project into the spaces between links of said chain; at least one body member mounted on said chain and spanning the space between a pair of adjacent links; a pair of jaws mounted on said body member for movement relative to one another; yieldable means reacting between said body member and at least one of said jaws for urging said jaws relatively towards one another; and actuating means movably mounted on said body member for engagement by a tooth of either of said wheels to effect relative movement of said jaws away from one another.

3. The mechanism set forth in claim 2 wherein one of said jaws is fixed on said body member and the other of said jaws is pivoted on said body member.

4. The mechanism set forth in claim 3 wherein said actuating means comprises a pin slideably mounted on said body member for engagement with said tooth and with said pivoted jaw.

5. The combination defined in claim 2 in which said sprocket wheels are supported so that the radial projection of their teeth is generally in the plane of the sheet being carried.

References Cited in the file of this patent

UNITED STATES PATENTS

| | | |
|---|---|---|
| 1,999,587 | Davis | Apr. 30, 1935 |
| 2,024,140 | Belluche | Dec. 17, 1935 |
| 2,262,631 | Belluche | Nov. 11, 1941 |
| 2,991,998 | Golding | July 11, 1961 |